United States Patent [19]

Föhl

[11] 4,230,289
[45] Oct. 28, 1980

[54] AUTOMATIC WIND-UP ROLLER FOR SAFETY BELTS

[75] Inventor: Artur Föhl, Schorndorf, Fed. Rep. of Germany

[73] Assignee: Repa Feinstanzwerk GmbH, Alfdorf, Fed. Rep. of Germany

[21] Appl. No.: 43,233

[22] Filed: May 29, 1979

[30] Foreign Application Priority Data

May 30, 1978 [DE] Fed. Rep. of Germany ....... 2823487

[51] Int. Cl.³ .................... A62B 35/02; B65H 75/48
[52] U.S. Cl. .................... 242/107.4 A; 247/107.4 B
[58] Field of Search ................ 242/107.4 R–107.4 E, 242/107.6, 107.7; 280/806–808; 247/388

[56] References Cited

U.S. PATENT DOCUMENTS

| | | |
|---|---|---|
| 3,944,162 | 3/1976 | Henderson .................... 242/107.4 A |
| 3,944,164 | 3/1976 | Tibbe ............................ 242/107.4 A |
| 3,991,953 | 11/1976 | Takada ......................... 242/107.4 A |

Primary Examiner—John M. Jillions
Attorney, Agent, or Firm—Herbert L. Lerner

[57] ABSTRACT

Automatic wind-up roller for a safety belt with means to stop the belt from unwinding in case of danger. The wind-up roller has a release mechanism activated when a predetermined acceleration or deceleration is exceeded, a control lever activated by the release mechanism, a control disc with elastic yielding control teeth which couple with the control lever, and a locking mechanism activated by the control disc to block the control shaft.

9 Claims, 2 Drawing Figures

AUTOMATIC WIND-UP ROLLER FOR SAFETY BELTS

BACKGROUND OF THE INVENTION

1. Field of the Invention

The invention relates to an automatic wind-up roller for safety belts with means to block the belt roll in case of danger, with a release mechanism which has a coupling effect on a control disc when the permissible acceleration or deceleration of the vehicle is exceeded, including blocking means which are activated by the control disc.

2. Description of the Prior Art

In a known automatic wind-up roller for a safety belt of the above-mentioned type (German Published Non-Prosecuted Application No. 26 29 220), a release mechanism in the form of a so-called ball sensor is secured to the outside of the automatic wind-up device. The ball sensor activates a rigid control lever when predetermined acceleration or deceleration of the vehicle is exceeded. As a result the control lever engages the fixed outer teeth of a control disc, blocks the control disc for a short time, and thereby activates a locking mechanism. What can happen when the release mechanism is activated i.e. in the case of danger, is that the rigid end of the control lever which is moved by the release mechanism directly meets the top of a tooth of the control disc which is also rigid, with the result that for at least a short time mechanical engagement to brake the motion of the control disc does not occur, and consequently coupling is not effected. Instead the control lever is pushed away from the control disc.

SUMMARY OF THE INVENTION

An object of the present invention is to provide an improved above-mentioned automatic wind-up roller for safety belts which without special construction complexity will assure increased safety with respect to the functioning of the release- and locking operation.

With the foregoing and other objects in view, there is provided in accordance with the invention, an automatic wind-up roller for a safety belt of a vehicle with means to block a belt shaft on which the safety belt is wound in case of danger, having a housing, a belt shaft rotatably supported in the housing, a safety belt rolled around the belt shaft, a release mechanism which is activated when a predetermined acceleration or deceleration of the vehicle is exceeded, a control lever activated by the release mechanism, a control disc rotatable with respect to the belt shaft, said control disc having elastic, yielding control teeth which couple with the control lever when the latter is activated, and a locking mechanism activated by said control disc to block said belt shaft.

Other features which are considered as characteristic for the invention are set forth in the appended claims.

Although the invention is illustrated and described herein as embodied in an automatic wind-up roller for safety belts, it is nevertheless not intended to be limited to the details shown, since various modifications and structural changes may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings, in which.

DETAILED DESCRIPTION OF THE INVENTION

Figure 2:
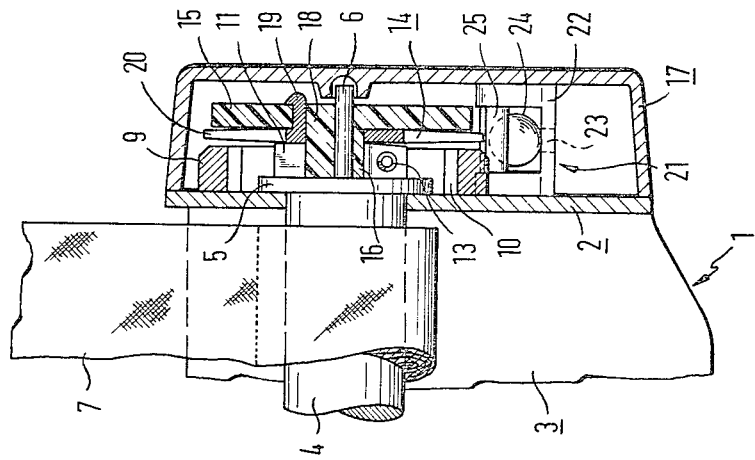
FIG. 2 is a front-sectional view of the automatic wind-up roller for safety belts taken along line II—II of FIG. 1.

According to the invention, the control disc is freely rotatable with respect to the belt shaft and preferably made of plastic with elastic, yielding control teeth which can be coupled with a control lever of the release mechanism. This simple measure assures that a coupling between control lever and control disc, and thereby the operation of the locking mechanism is reliably effected. These elastic control teeth can easily change shape, and bend with increasing load, but due to the elasticity of the material no permanent deformation of the control teeth takes place. In contrast to the rather complicated construction of control discs in known automatic wind-up rollers for safety belts, the above-described control disc is very simple and can be manufactured at a low cost.

An improvement with respect to the coupling efficiency is further achieved by providing the star-like or ray-like control teeth with small tooth edges which are preferably like knife edges.

The control disc is provided with a control cam which, at relative motion between the belt shaft and the control disc, directly or indirectly moves a locking pawl into the engaged position with a set of locking teeth. Thereby, the control cam can be so designed or so constructed that the locking pawl engages the locking teeth from inside towards the outside or from the outside to the inside, for example, a toothed ring with inner teeth, respectively a disc with outer teeth. To obtain a direct, very quick effect of the control disc on the lock mechanism, it is advantageous if the stop teeth configuration which is coaxial to the control disc, has the same teeth distribution and number of teeth as the control disc. Thus, the position of the teeth can be chosen to have the locking pawl consistently fall into a tooth space of the inner teeth of the locking means.

According to a further development of the invention, the control disc is fixedly connected, preferably by interlocking projections, with an inertia disc. Due to this inertia disc, one obtains an additional release mechanism when exceeding a predetermined acceleration or deceleration of the vehicle. Because of the simple construction connecting the control disc and the inertia disc, automatic wind-up rollers for safety belts may be provided with or without the inertia disc, without requiring different control discs.

In a preferred embodiment of the invention, a toothed ring which can be locked by means of the control disc and the locking pawl serves as the activating element for a lock-pawl which is lockable with a toothed locking wheel. The locking wheel has a cam-shaped projection which causes a locking pawl which is hingeably supported on the housing of the automatic wind-up roller, to engage with the teeth of a locking disc on the belt axis.

Within the frame of the invention, the construction and arrangement of the release- and locking mechanism may be varied. For example, the control lever of the release mechanism can get into the engaged position with the control teeth of the control disc radially or axially, with respect to the belt axis. Further, it is possible to provide, in addition to the described release- and locking mechanism, additional locking mechanisms, or to use the described mechanism only as an additional emergency lock.

Figure 1:
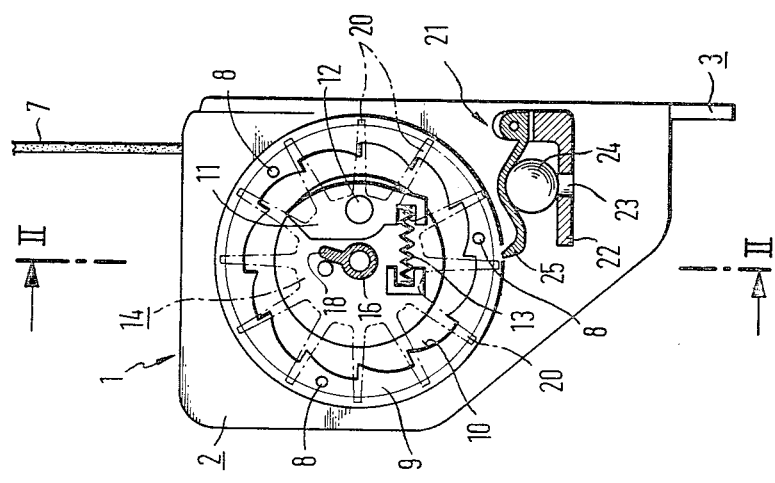
FIG. 1 is a side view in partial section, of the automatic wind-up roller for a safety belt according to the invention, with the cover and inertia disc removed.

Further advantageous details of the invention will be explained by means of the embodiment shown in the drawing and described in the following:

In the embodiment according to FIGS. 1 and 2, the housing 1 of the safety belt wind-up roller, made of a stable material, consists principally of two side legs 2 and a transverse portion 3. The belt-axis or belt shaft 4 is rotatably supported, in the side legs 2, of which only one is shown in the figures. The belt shaft 4 extends through the side leg 2, and is provided with a flange 5 and also with a thin cylindrical pin 6. The safety belt 7 is rolled on the belt axis 4. At the outer surface of the side leg 2, secured for example, by rivets 8 or by welding, is an internal locking ring 9 with internal locking teeth 10, concentric to the belt shaft 4. A two-legged locking pawl 11 is hingeably supported at the flange 5 on a support pin 12, eccentrically to the belt axis 4. The upper edge of this locking pawl 11 is pressed toward the belt axis 4 by a spring 13 as shown in FIG. 1. For better clarity, a control disc 14 is shown in dotted outline in FIG. 1. The inertia disc 15 which is connected to the control disc 14 is not shown in FIG. 1; also not shown in FIG. 1 is the cover 17 but disc 14 and disc 15 are shown in FIG. 2. The inertia disc 15 which is made of a dense material, for example a plastic with a high specific gravity, has extending from it projection 16 which serves as bearing-bore, and which also carries a control cam 18. The control disc 14 which is provided with a corresponding bearing hole is fitted to the bearing projection 16 and the control cam 18. The control disc has three hook-shaped, springy detent projections 19, which engage in corresponding openings in the inertia disc 15. The control disc—inertia disc unit is rotatable with respect to the belt axis 4 and is supported on pin 6 of the belt shaft 4. The control disc 14 is provided with ray-like small control teeth 20 which coincide in tooth arrangement and tooth number with the locking teeth 10. The control teeth 20 are elastically yielding and have very small, i.e. narrow, for example, knife-like tapering tooth edges.

A release mechanism generally designated by numeral 21 is in the form of a so-called ball sensor, consisting of a base plate 22, a center bore 23, a ball 24, and a hingeable control lever 25 which lightly rests on the ball 24. The parts are covered by the cover 17.

The release mechanism is activated at an excessive deceleration or acceleration of the vehicle in the direction of travel or in an angle to the direction of travel. In such a case the ball 24 moves outside from the region of center bore 23 with the result that the control lever 25 is pressed upward. The pointed coupling edge of the control lever 25 gets into the region of the elastic control teeth 20 of the control disc 14. As the safety belt 7 unwinds, and thereby also the control and inertia disc rotates, the nearest control tooth 20 hits the control lever 25 causing the control disc 14 to stop instantly. Even though control disc 14 is stopped, the belt axis 4 continues to turn a slight amount further with the result that there is relative motion between the belt shaft 4 and the control disc 14. As a consequence the control cam 18 runs up on the inner surface of the locking pawl 11, and presses the locking pawl 11 against the locking teeth 10. The orientation of the teeth to each other is so designed that the locking pawl 11 is certain to fall into a tooth space of the locking teeth 10, so that a secure engagement of the locking pawl 11 with nearest locking tooth 10 is effected. In this manner, rotation of the belt shaft 4 is blocked and unwinding of belt 7 is stopped. Blocking of the belt or shaft 4 is also achieved without triggering the release mechanism 21 by means of the inertia disc 15. This occurs when there is a sudden or rapid withdrawal of the belt 7, because this inertia disc 15 does not follow at the same rate of rotation as the sudden rotation of the belt shaft 4. As a consequence, relative motion between the control disc 14 and the belt shaft 4 takes place, with the result that again the locking pawl 11 is moved into the locking position.

There are claimed:

1. Automatic wind-up roller for a safety belt of a vehicle with means to block a belt shaft on which the safety belt is wound in case of danger, having a housing, a belt shaft rotatably supported in the housing, a safety belt rolled around the belt shaft, a release mechanism which is activated when a predetermined acceleration or deceleration of the vehicle is exceeded, a control lever activated by the release mechanism, a control disc rotatable with respect to the belt shaft, said control disc having elastic, yielding control teeth which couple with the control lever when the latter is activated, and a locking mechanism activated by said control disc to block said belt shaft.

2. Automatic wind-up roller for a safety belt according to claim 1 wherein the control teeth extend from the control disc in the form of ray-shaped control teeth and have small knife-shaped tooth edges.

3. Automatic wind-up rollers for a safety belt according to claim 1, wherein said means to block a belt shaft comprise a locking pawl which moves into engagement with locking teeth, and wherein the control disc is provided with a control cam, which at a relative motion between the belt shaft and the control disc moves the locking pawl into engagement with the locking teeth.

4. Automatic wind-up roller for a safety belt according to claim 3 wherein the locking teeth are coaxial to the control disc and have the same tooth arrangement and tooth number.

5. Automatic wind-up roller for a safety belt according to claim 3, wherein the control disc is in fixed connection with an inertia disc which latter does not follow at the same rate of rotation as the belt shaft when there is a sudden or rapid withdrawal of the belt, and as a consequence relative motion between the control disc and the belt shaft takes place.

6. Automatic wind-up roller for a safety belt according to claim 5, wherein the fixed connection is by means of detent projections extending from the control disc into openings in said inertia disc.

7. Automatic wind-up roller for a safety belt according to claim 5, wherein the inertia disc has a support projection on which support projection the control disc is in fixed position.

8. Automatic wind-up roller for a safety belt according to claim 3, wherein said locking teeth are in the form of a toothed locking ring with internal teeth secured to the housing coaxially to the belt shaft and wherein said control disc and the hingeable locking pawl are rotatable on a pin of the belt shaft.

9. Automatic wind-up roller for a safety belt according to claim 8, wherein an inertia disc is also rotatable on said pin of the belt shaft which disc does not follow the same rate of rotation as the belt shaft when there is a sudden or rapid withdrawal of the belt and as a consequence relative motion between the control disc and the belt shaft takes place.

* * * * *